(12) United States Patent
Korjik et al.

(10) Patent No.: US 9,335,436 B2
(45) Date of Patent: May 10, 2016

(54) NANOSTRUCTURED NEUTRON SENSITIVE MATERIALS FOR WELL LOGGING APPLICATIONS

(71) Applicants: Mikhail Korjik, Minsk (BY); Andrei Federov, Minsk (BY); Maxim Vasilyev, Houston, TX (US); Anton Nikitin, Houston, TX (US)

(72) Inventors: Mikhail Korjik, Minsk (BY); Andrei Federov, Minsk (BY); Maxim Vasilyev, Houston, TX (US); Anton Nikitin, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 91 days.

(21) Appl. No.: 14/026,506

(22) Filed: Sep. 13, 2013

(65) Prior Publication Data

US 2015/0076336 A1    Mar. 19, 2015

(51) Int. Cl.
*G01V 5/08* (2006.01)
*G01V 5/10* (2006.01)
*G01T 3/06* (2006.01)

(52) U.S. Cl.
CPC ... *G01V 5/10* (2013.01); *G01T 3/06* (2013.01); *G01V 5/107* (2013.01); *Y10T 29/49117* (2015.01)

(58) Field of Classification Search
CPC ....... E21B 47/102; E21B 49/08; E21B 49/10; G01V 8/02; G01V 21/359; G01V 5/107; G01V 5/104; G01V 5/10; G01V 5/108; G01V 5/101; G01V 5/102
USPC ................ 250/269.1, 269.4–269.6
See application file for complete search history.

(56) References Cited

U.S. PATENT DOCUMENTS

| | | | |
|---|---|---|---|
| 4,421,671 | A | 12/1983 | Cusano et al. |
| 4,760,252 | A | 7/1988 | Albats et al. |
| 7,126,148 | B2 | 10/2006 | Murray et al. |

(Continued)

FOREIGN PATENT DOCUMENTS

EP        2146226 A1    1/2010

OTHER PUBLICATIONS

Dosovitskiy et al. ("Development of the new generation of glass-based neutron detection materials" Hard X-Ray, Gamma-Ray, and Neutron Detector Physics XIV Ralph B. James; Arnold Burger; Larry A. Franks; Michael Fiederle San Diego, California, USA | Aug. 12, 2012, Proc. of SPIE vol. 8507 pp. 85070Q-1-85070Q-9).*

(Continued)

*Primary Examiner* — David Porta
*Assistant Examiner* — Mamadou Faye
(74) *Attorney, Agent, or Firm* — Cantor Colburn LLP

(57) ABSTRACT

An apparatus for estimating a property of an earth formation includes: a neutron source disposed in a borehole; a neutron detector having a neutron detection material that includes a material transparent to light having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality; a photodetector that receives the photons and provides a signal correlated to the photons; and a processor to estimate the property using the signal.

15 Claims, 9 Drawing Sheets

(56) References Cited

U.S. PATENT DOCUMENTS

| | | | |
|---|---|---|---|
| 7,507,952 | B2 | 3/2009 | Groves et al. |
| 7,544,928 | B2 | 6/2009 | Hassan et al. |
| 2004/0222368 | A1 | 11/2004 | Odom et al. |
| 2006/0054863 | A1* | 3/2006 | Dai et al. ............... 252/301.4 R |
| 2011/0049345 | A1* | 3/2011 | Roberts ...................... 250/269.6 |
| 2011/0192981 | A1 | 8/2011 | Menge et al. |
| 2013/0075600 | A1* | 3/2013 | Nikitin et al. .............. 250/269.4 |

OTHER PUBLICATIONS

Elphic, Richard, C. et al, Surface and Borehole Neutron Probes fro the Construction and Resource Utilization eXplorer (CRUX). IEEEAC, paper #1395, Version 1, Updated Oct. 28, 2005. pp. 1-9.

Notification of Transmittal of the International Search Report and the Written Opinion of the International Searching Authority, or the Declaration; PCT/US2012/056044; Feb. 26, 2013, 11 pages.

Nuclear Logging, [online]; retrieved on Oct. 26, 2011]; retrieved from the Internet http://www.epa.gov./esd/cmb/GeophysicsWebsite/pages/reference/methods/Borehole_ge . . . pp. 1-12.

Spowart, A. R., "Neutron Scintillating Glasses: Part 1", Nuclear Instruments and Methods 135 (1976), pp. 441-453.

Spowart, A. R., "Neutron Scintillating Glasses: Part II", Nuclear Instruments and Methods 135 (1977), North Holland Publishing, pp. 19-28.

Spowart, A. R., "Neutron Scintillating Glasses: Part III", Nuclear Instruments and Methods 150 (1978), North Holland Publishing, pp. 1159-1163.

Notification of Transmittal of the International Search Report and the Written Opinion of the International Searching Authority; PCT/US2014/055341; Korean Intellectual Property Office; Mailed Dec. 23, 2014; 11 pages.

\* cited by examiner

NANOSTRUCTURED NEUTRON SENSITIVE MATERIALS FOR WELL LOGGING APPLICATIONS

BACKGROUND

Geologic formations are used for many purposes such as hydrocarbon production, geothermal production and carbon dioxide sequestration. In general, formations are characterized in order to determine if the formations are suitable for their intended purpose.

One way to characterize a formation is to convey a downhole tool through a borehole penetrating the formation. The tool is configured to perform measurements of one or more properties of the formation at various depths in the borehole to create a measurement log.

Many types of logs can be used to characterize a formation. In one type of log referred to as a neutron log, a neutron source and a neutron detector are disposed in a downhole tool. The neutron source is used to irradiate the formation and the neutrons resulting from interactions with atoms of the formation are detected with the neutron detector. A formation property such as density or porosity can be determined from the detected neutrons. It can be appreciated that improving the sensitivity of the neutron detector can improve the accuracy of the formation characterization.

BRIEF SUMMARY

Disclosed is an apparatus for estimating a property of an earth formation penetrated by a borehole. The apparatus includes: a carrier configured to be conveyed through the borehole; a neutron source disposed on the carrier and configured to irradiate the formation with neutrons; a neutron detector disposed at the carrier and comprising a neutron detection material, the neutron detection material includes a material transparent to light having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality; a photodetector optically coupled to the neutron detection material and configured to detect the light photons emitted from the scintillation and to provide a signal correlated to the detected light photons; and a processor configured to estimate the property using the signal.

Also disclosed is a method for estimating a property of an earth formation penetrated by a borehole. The method includes: conveying a carrier through the borehole; irradiating the formation with neutrons emitted from a neutron source; receiving neutrons resulting from interactions of the emitted neutrons with the formation using a neutron detector, the neutron detector comprising a neutron detection material comprising a material transparent to light having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality; receiving the light photons emitted by the scintillation using a photodetector to produce a signal; and estimating the property using a processor that receives the signal.

Further disclosed is a method for fabricating an apparatus for estimating a property of an earth formation penetrated by a borehole. The method includes: disposing a neutron source configured to irradiate the formation with neutrons on a carrier configured to be conveyed through the borehole; disposing a neutron detector comprising neutron detection material on the carrier, the neutron detection material comprising an optically transparent material having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality; disposing a photodetector on the carrier, the photodetector being optically coupled to the neutron detection material and configured to detect the light photons emitted from the scintillation and to provide a signal correlated to the detected light photons; and coupling a processor to the photodetector, the processor being configured to receive the signal and to estimate the property using the signal. The neutron detector material having the plurality of nano-crystallites is fabricated by a method including: mixing the optically transparent material, the neutron interaction material, and the activator material together to form a mixture; and subjecting the mixture to a heat treatment process that includes a plurality of time intervals having a corresponding temperature profile.

BRIEF DESCRIPTION OF THE DRAWINGS

The following descriptions should not be considered limiting in any way. With reference to the accompanying drawings, like elements are numbered alike.

DETAILED DESCRIPTION

Disclosed are apparatus and method for detecting neutrons in a downhole tool with improved sensitivity and, hence, accuracy. In one or more embodiments, neutrons detected during neutron well logging operations are used to estimate a property of an earth formation such as density or porosity using processing techniques known in the art.

A detailed description of one or more embodiments of the disclosed apparatus and method presented herein by way of exemplification and not limitation with reference to the Figures.

Figure 1:
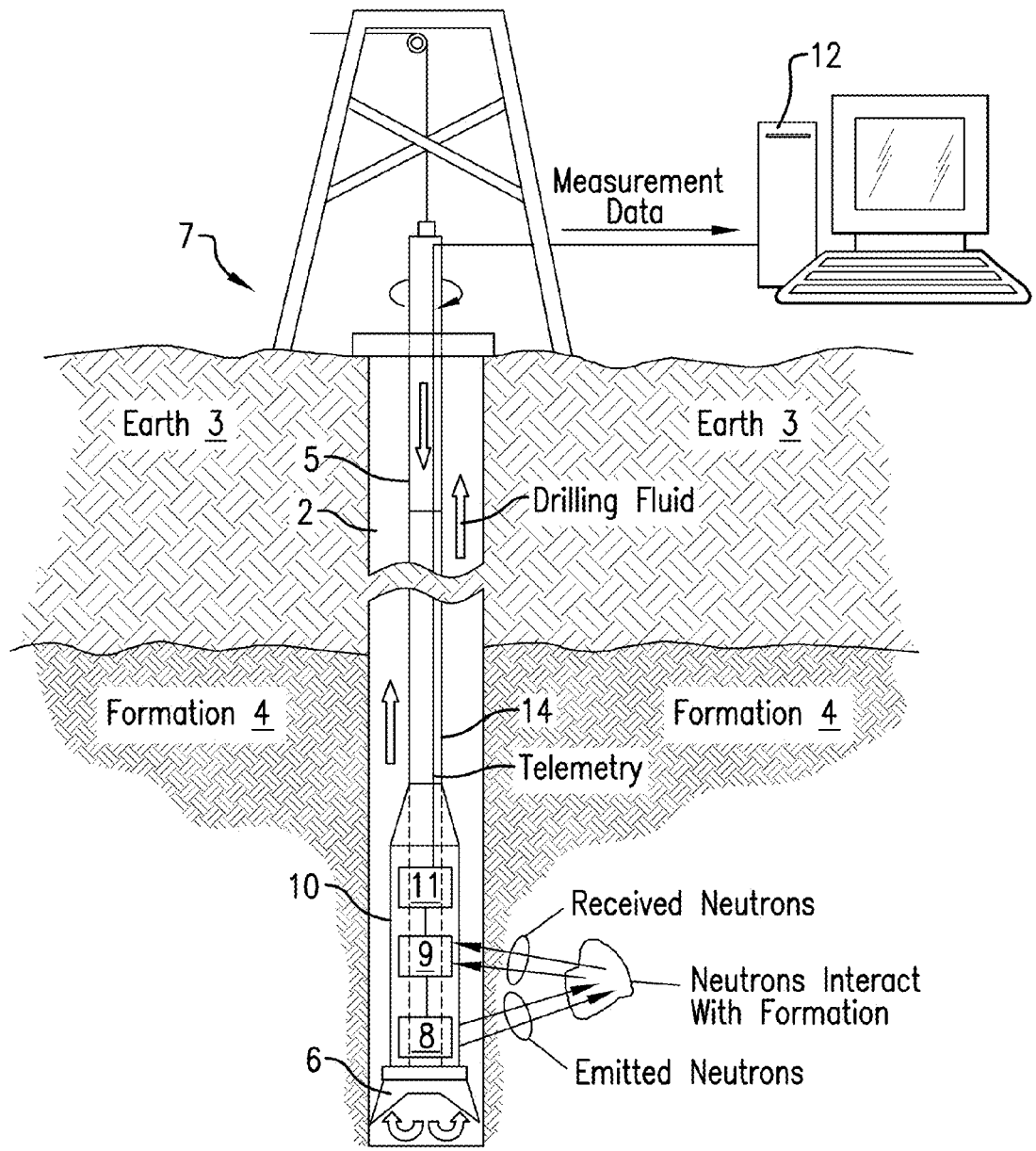
FIG. 1 illustrates an exemplary embodiment of a downhole neutron tool disposed in a borehole penetrating the earth.

FIG. 1 illustrates an exemplary embodiment of a downhole neutron tool 10 disposed in a borehole 2 penetrating the earth 3, which includes an earth formation 4. The formation 4 represents any subsurface materials of interest. The downhole tool 10 is conveyed through the borehole 2 by a carrier 14. In the embodiment of FIG. 1, the carrier 14 is a drill string 5. Disposed at the distal end of the drill string 5 is a drill bit 6. A drilling rig 7 is configured to conduct drilling operations such as rotating the drill string 5 and thus the drill bit 6 in order to drill the borehole 2. The neutron tool 10 is configured to perform formation measurements while the borehole 2 is being drilling or during a temporary halt in drilling in an application referred to as logging-while-drilling (LWD). In an alternative logging application referred to as wireline logging, the carrier 14 is an armored wireline configured to convey the neutron tool 10 through the borehole 2.

Still referring to FIG. 1, the downhole neutron tool 10 includes a neutron source 8 configured to irradiate the formation 4 with a flux of neutrons. In one or more embodiments, the neutron source 8 includes a chemical neutron source. The neutron tool 10 also includes a neutron detector 9 configured to detect neutrons resulting from interactions of the neutron flux with atoms in the formation 4. From the detection of the neutrons resulting from the interactions, one of more properties, such as density or porosity, can be determined using an output signal from the neutron detector as would be known to one of skill in the art.

Still referring to FIG. 1, the neutron detector 9 is coupled to downhole electronics 11. The downhole electronics 11 are configured to operate the downhole tool 10, process data from formation measurements, and/or provide an interface for transmitting data to a surface computer processing system 12 via a telemetry system. In one or more embodiments, the downhole electronics 11 can provide operating voltages to the neutron detector 9 and measure or count electrical current pulses resulting from neutron detection. Processing functions such as counting detected neutrons or determining a formation property can be performed by the downhole electronics 11 or the surface computer processing system 12.

Figure 2:
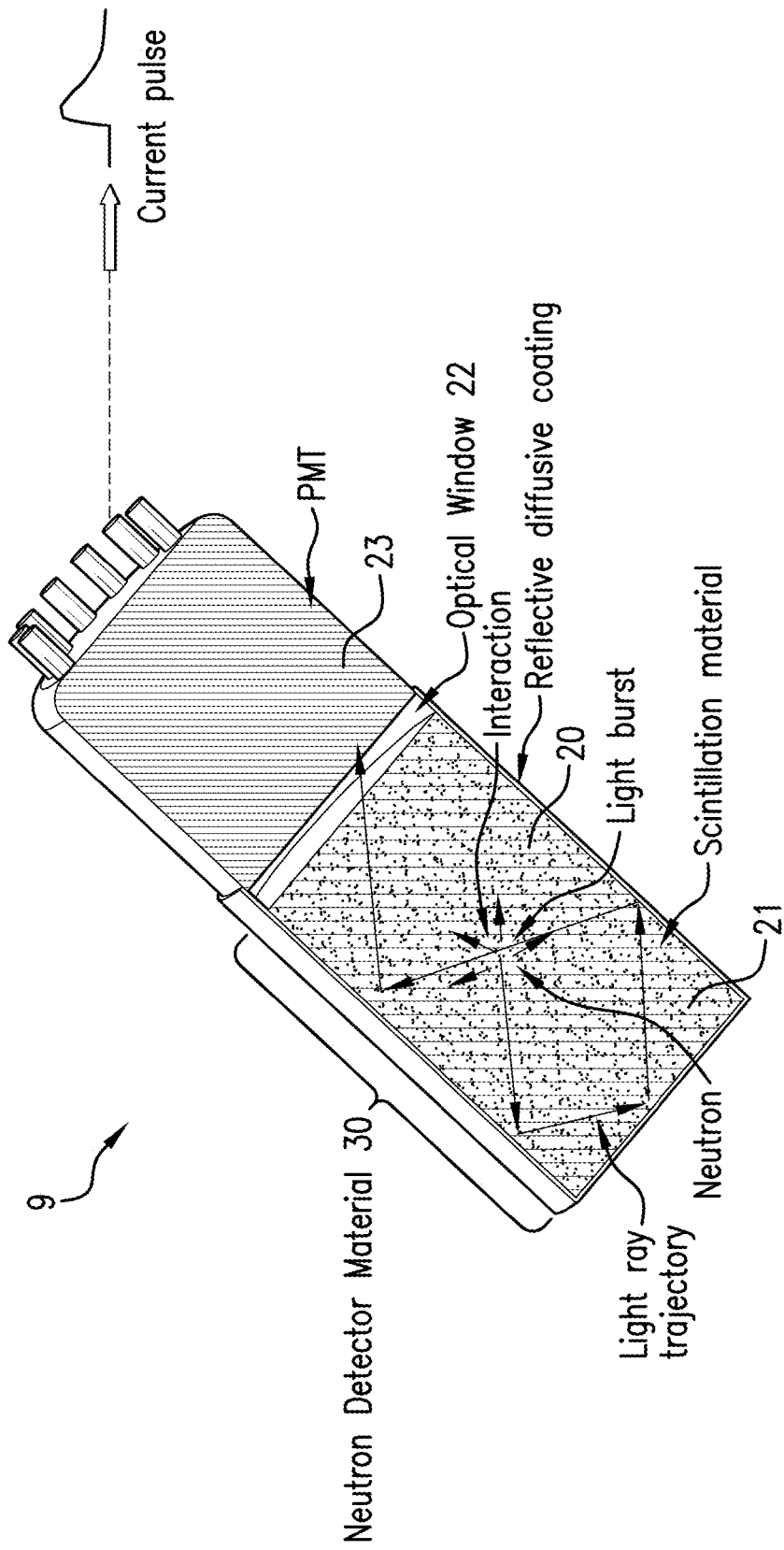
FIG. 2 depicts aspects of a scintillation detector disposed at the downhole neutron tool.

Reference may now be had to FIG. 2 depicting aspects of the neutron detector 9. The neutron detector 9 is a device for converting detected neutrons into the pulses of voltage or current, which can be registered by the electronics such as the downhole electronics 11. Such a conversion includes two stages. In a first stage, a detected neutron is absorbed in a neutron interaction material 20 that emits a charged particle(s) upon absorption of the neutron. In a second stage, energy carried by the charged particle(s) is converted into a current/voltage pulse. In one or more embodiments, the first stage of the neutron detection process can utilize the following nuclear reaction when the neutron interacts with the nucleus of 6Li isotope in the neutron interaction material to emit the charged particle(s):

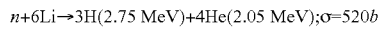

$$n+6Li\rightarrow 3H(2.75\text{ MeV})+4He(2.05\text{ MeV}); \sigma=520b$$

Shown here are values of the reaction cross-section σ for thermal neutrons with energy En=0.025 eV.

The second stage is based on a scintillation process that occurs based on the charged particle(s) interacting with a scintillation material 21. Moving through the scintillation material, the charged particle(s) experience losses of the energy due to ionization. Part of the lost energy is transferred into visible light emitted when excitons (i.e., electron-hole pairs) are relaxed at luminescent centers of scintillation. The emitted visible light is collected at an optical window 22 of a photodetector 23 such as photomultiplier tube (PMT), which converts the emitted visible light signal into the pulse of voltage/current. A material having a combination of both the neutron interaction material 20 and the scintillation material 21 may be referred to as a neutron detector material 30.

The yield of the scintillation depends on the yields of different processes contributing into the scintillation. The light yield of scintillation Y is defined as the amount of light quanta emitted by a scintillator per unit energy deposited by ionizing radiation in the medium. It is defined by a formal equation reflecting physical processes which are involved in the scintillation creation:

$$Y = \frac{E_p}{\beta \cdot E_g} S \cdot Q \qquad [1]$$

Here, the $$\frac{E_p}{\beta \cdot E_g}$$

part characterizes conversion property of the medium where $\beta \cdot E_g$ is the mean energy necessary for the formation of one thermalized electron-hole pair in a medium with a forbidden zone of width $E_g$, and $E_p$ is the absorbed energy due to interaction of the created particles with the medium. Parameter S is defined by the efficiency of the energy transfer of thermalized pairs to the excited states of luminescent centers and Q is the quantum yield of the intra-center luminescence.

Figure 3:
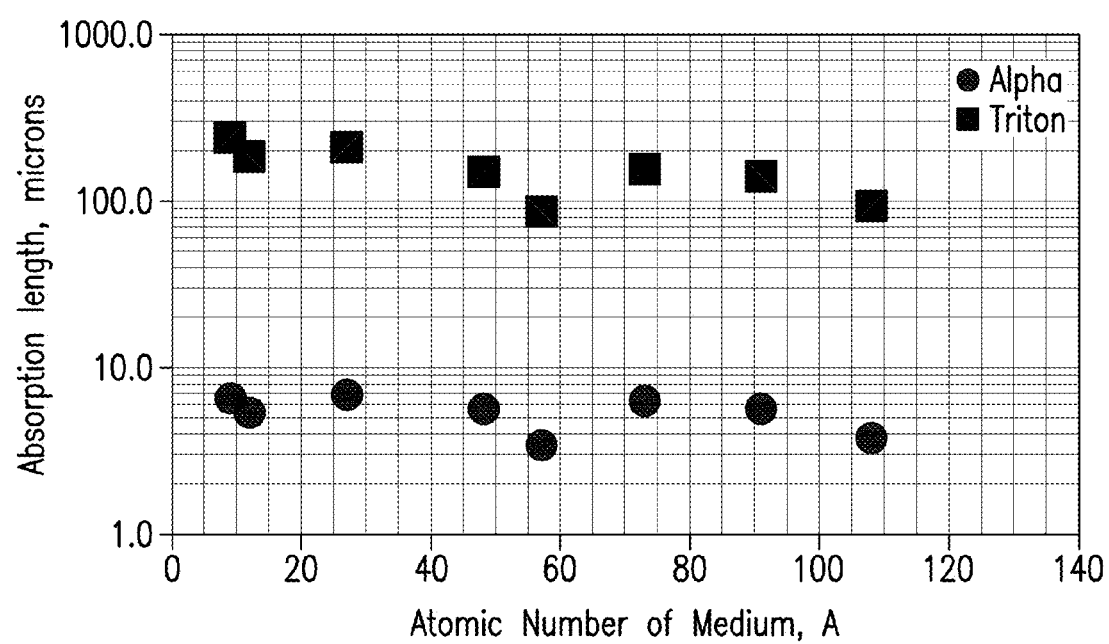
FIG. 3 depicts aspects of dependence of the average path length of 3H and 4He nuclei on the atomic number of medium.

Triton-particle 3H(2.75 MeV) and alpha-particle 4He(2.05 MeV), which are created at interaction with the 6Li isotope, lose their energy in the medium due to ionization. If density of the medium is very high, then the path length of the particles is very short, such as at the level of few microns. This leads to the high density of ionization in the small areas of the medium resulting in a small output of the scintillation. Thus, a medium containing Li has to contain as much as possible the amount of light atoms to provide as long as possible particle paths. FIG. 3 illustrates dependence of the average path length of 3H and 4He nucleons on the atomic number of medium. To provide excitation of the largest area of the medium by created charged particles, the medium should contain in addition to Li other light atoms, such as from the second and third periods of the periodic table of elements. These requirements are opposite to the requirements to the scintillation medium to detect γ(photon)-quanta. Light elements can form a variety of crystalline and amorphous compounds which may be transparent in the UV and visible range.

Figure 4:
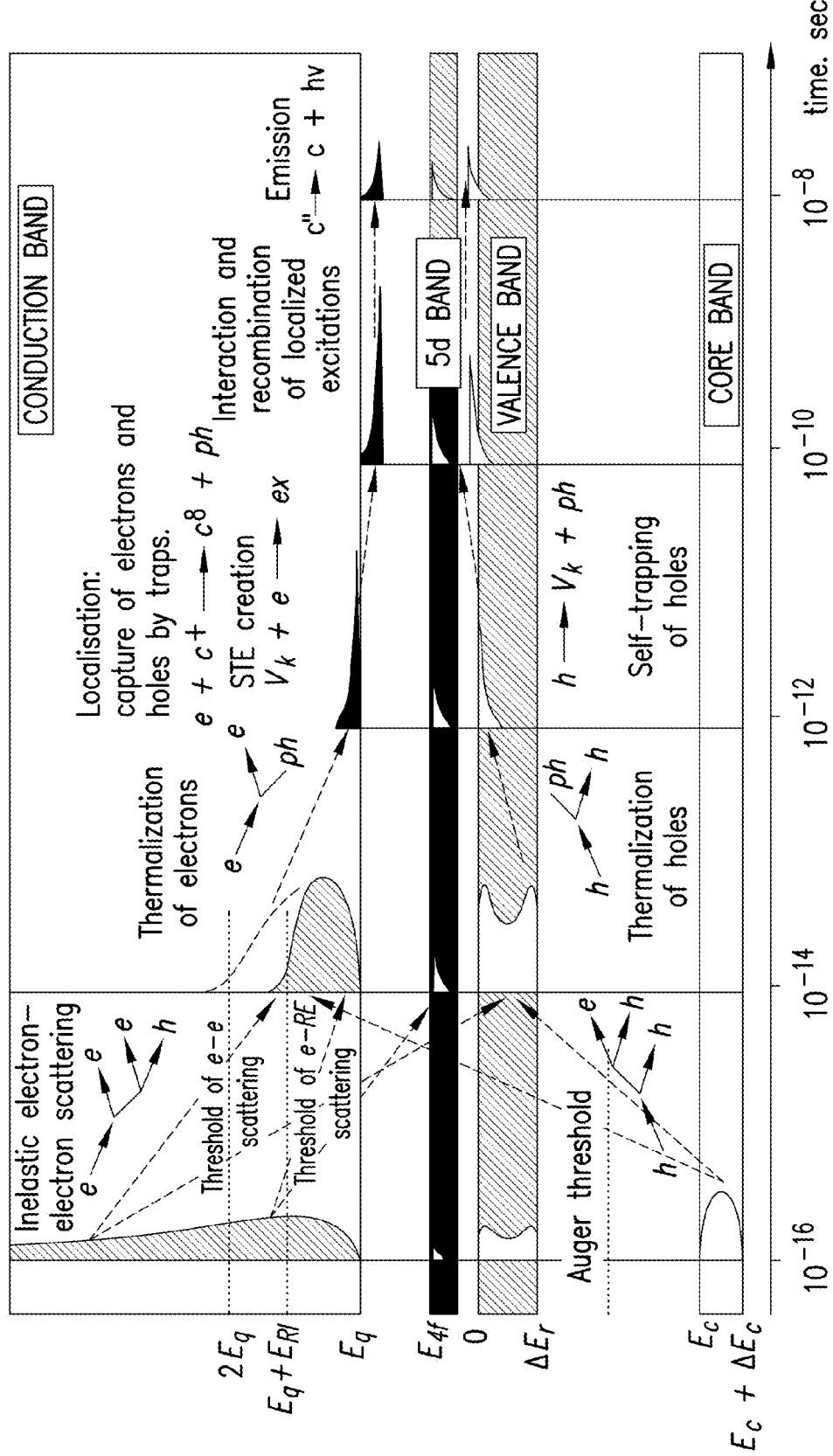
FIG. 4 depicts aspects of a scintillation process development in the crystalline material containing scintillating ions of $Ce^{3+}$.

Crystalline compounds, single crystals and poly-crystals are more suitable to construct high light yield scintillation materials. The scintillation process in a crystalline medium has several phases providing the relaxation of the hot electron and hole excited states formed when the charged particle(s) interacts with the scintillation material 21. The "hot" carriers are created along the charged particle trajectory due to ionization losses of its energy. The term "hot" relates to an electron or hole having an increase in its energy. The scheme illustrating relaxation of such "hot" carriers when the scintillation material is doped (or activated) with Ce (referred to as scintillating atoms) is shown in FIG. 4. In the first phase (multiplication phase), inelastic electron scattering and electron and hole multiplication (i.e., the creation of "hot" electrons and holes with the energy much higher than the scintillation material band gap Eg value) occurs. In a thermalization phase, thermalization of the "hot" electrons and holes occurs. In a localization phase, localization of electrons and holes at $Ce^{3+}$ ions occurs along with the formation of electron-hole pairs (i.e., excitons). Second and third phases are represented by the value of the factor S. In the last phase, an emission of the ultraviolet (UV) or light photon occurs. This is an intracentre process and it is represented by the factor Q. At certain specific conditions, this factor could reach one for many compounds at room temperature.

It should be pointed out that the amount of Li single crystalline compounds doped with $Ce^{3+}$ and exhibiting scintillation properties is limited by nature. There are some single crystalline compounds that combine elements of the groups 2-6 and being doped with $Ce^{3+}$ will exhibit scintillation properties, however they are not suitable for operation in the neutron detector 9.

There is even a more limited amount of the single crystalline compounds that are transparent in a visible range and formed from the light atoms. The lightest transparent and stable in the atmospheric conditions are inorganic single crystalline compounds formed by Li and boron atoms such as lithium tetraborate ($Li_2B_4O_7$), and lithium fluoride (LiF). However, these compounds do not allow doping with trivalent $Ce^{3+}$ and do not scintillate.

There is a plurality of the glass materials made up of light elements that are transparent in the near UV and visible range. Most of them can be created on a base of Si or B. Li containing glass can be obtained with B and/or Si or a mixture of those two elements. The $^{10}B$ isotope also effectively captures thermalized neutrons due to following reaction:

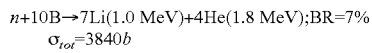

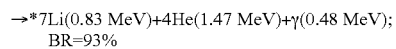

Energy deposit in the boron containing medium per interaction is about 3 times less than in the case of $^6Li$ containing medium, so the scintillation signal will be three times smaller correspondingly. Boron nuclei will predominantly capture neutrons making detector response smaller in a scintillator containing $^6Li$ and $^{10}B$ nuclei. Due to this reason, a glass containing atoms of Li and Si is preferable. To form charge compensated glass that contains $Li^+$ and $Si^{4+}$ ions, the glass also has to contain a trivalent ion. Next after $B^{3+}$ is the trivalent $Al^{3+}$ ion. $Li^+$, $Si^{4+}$, and $Al^{3+}$ combined in a form of oxides or other chemicals like carbonates, nitrates and being melted form a variety of different glasses. These glasses can contain other elements of the 2 and 3 periods of the periodic table. The highest concentration of $^6Li$ in the medium is required for effective capturing of neutrons. It is accomplished both by enriching of the Li with $^6Li$ isotope and using glass systems containing the highest concentration of Li ions.

The atomic structural properties of glass scintillation materials are different from the properties of crystalline scintillation materials. Because of the absence of long range ordering in the atomic structure of the glass, which is an amorphous material, the ability for the fast and efficient transport of exciton energy to radiating centers is limited. Moreover, a localization site of a scintillation activator's ion in the glass atomic structure is not very well defined. The dispersion of $Ce^{3+}$ ion site structures in the glass appears due to their localization in slightly different chemical environments (several closest coordination shells formed by glass matrix atoms could have little bit different atomic structure). This splits energies of 5d states of Ce3+ ions, which are very sensitive to a crystalline field depending on the localization site, and, as a result a much wider and more disperse 5d radiating band is formed in the electronic structure of the glass scintillator in comparison with 5d band formed by Ce dopant in single crystal scintillation material. This fact and also a much higher probability of a structural defect presence in the vicinity of the $Ce^{3+}$ ions, which could trap thermalized charge carries and excitons and cause their non-radiative recombination in the case of glass, explains why a typical value of light yield (LY) for glass scintillation materials is much lower than typical value of LY for single crystal scintillators.

There is a family of the materials that are called glass ceramics and have an intermediate position between single crystals and glasses. Glass ceramics are glass-containing microcrystallites obtained due to thermal or other treatment of the glass. In general, microcrystallites have a diameter or size that is greater than or equal to 1000 nanometers (nm) or one micrometer.

In general, glass ceramics can be obtained by several methods. One of the methods is based on the synthesis of the microcrystallites inside the glass. In this case, the glass is made from a raw glass material with a chemical composition that is close to the chemical composition of the desired microcrystallites. After melting, the glass is exposed to a temperature close to the crystallization temperature for an extended period of time. The main goal of this step is to form the seeds of the desired microcrystallites. After this, the glass is exposed to gradually increasing temperature. The main goal of this step is to promote the growth of the microcrystallites inside of the glass matrix.

Microcrystallites generally at their formation in the glass can capture activating ions of $Ce^{3+}$ and form scintillating species. It requires high concentration (from several tenths of atomic (at.) % up to several at. %) of $Ce^{3+}$ in the precursor glass and crystallographic availability for cerium to be stabilized in the microcrystallites in the trivalent state.

When crystallites reach dimensions of several hundred nanometers they make glass ceramic translucent or even not transparent due to crystal phase separation in crystallites, when refractive indexes of crystal phases differ from each other and differ from that of amorphous glass body. So dimensions of the crystallites should be carefully controlled and kept at the nano level with size or diameter less than 1000 nm. In one or more embodiments, the size or diameter is about 100 nm or even less (but not less than 50 nm to keep exciton mechanism still effective). In one or more embodiments, the diameter or size of each of the nano-crystallites is in a range of 50 nm to 150 nm that provides for an effective mechanism and an adequate optical transparency.

According to Rayleigh's scattering theory, amount of the light passed through a unit of length of the composite material follows to the following formula:

$$I \propto I_0 \left(1 - \frac{r^6}{\lambda^4}\left[\frac{\left(\frac{n_{nano}}{n_{gl}}\right)^2 - 1}{\left(\frac{n_{nano}}{n_{gl}}\right)^2 + 2}\right]^2\right) \quad [2]$$

where I-intensity of the light passing through the glass filled with nanoparticles, $I_0$-incident intensity, r-radius of nanoparticle, $\lambda$-wavelength, $n_{nano}$-index of refraction of nanoparticles, $n_{gl}$-index of refraction of glass body. The $r/\lambda$ ratio describes scattering and the part in square brackets describes reflection at the interface between nano-object in the glass and glass. According to equation [2], light passes composite material without losses ($I=I_0$) only in three cases: i) r=0, ii), $\lambda=\infty$, iii) $n_{nano}=n_{gl}$. First and second conditions cannot be strictly satisfied in practice. If refraction indexes of nanoparticles and glass body differs, light losses will present to a lesser or larger degree for all practical wavelengths and nanoparticles dimensions, and even for dimensions lesser than wavelength. Only the third condition can be satisfied in practice, which takes place for scintillating nano-crystallites inside amorphous glass body of the present invention.

It is noted that in the glass system containing several cations, a crystallization of different crystallites can occur. They can be crystallized simultaneously or successively at the heat treatment of the glass. Many crystalline compounds can be crystallized in the glass system of $Al_2O_3$—$Li_2O$—$SiO_2$ when the Li concentration is high. The lowest temperature crystallizing compound in the $Al_2O_3$—$Li_2O$—$SiO_2$ glass system is spodumen $LiAlSi_2O_6$. Crystallization of the crystallites of spodumen in the considered glass system deteriorate transmittance of the glass-ceramics and makes light extraction difficult from the detector material. To avoid its crystallization, petalite $LiAlSi_2O_6$ nano-particles are mixed into the glass during the process of its preparation. Part of petalite nano-particles is dissolved but some of them still remain in the cooled glass. They become competing centers of the crystallization to spodumen when glass is annealed at temperature T, which is higher than glass vitrification temperature $T_g$ but less than temperature $T_c$ of the avalanche crystallization of spodumen. At such heat treatment conditions, the creation of spodumen crystallites is suppressed and the spodumen crystallites are kept at the level close to seeding. This process leads to the creation of fragments of the ordered periodic structure in the glass, which have nanoscale dimensions (less than 1000 nm). This is illustrated schematically in FIG. 5, which depicts schematic structure of nanostructured neutron detector material of the present invention.

Figure 5:
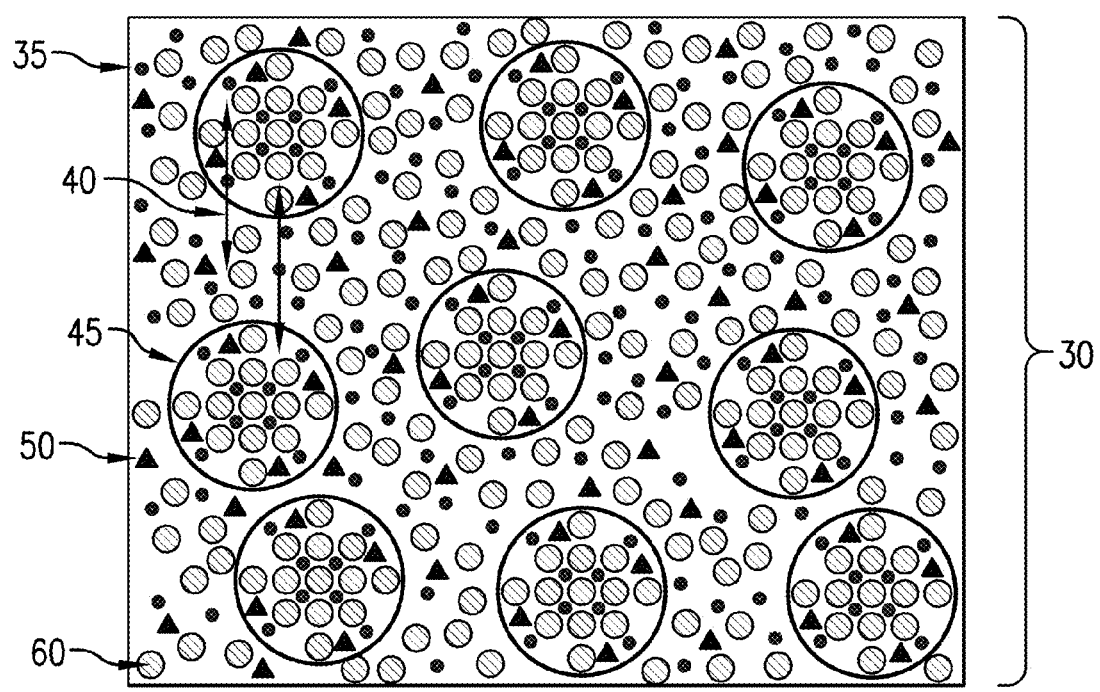
FIG. 5 depicts aspects of a schematic structure of nano-crystallite neutron detector material.

Illustrated in FIG. 5 is the neutron detector material 30 having a nano-structure that is optically transparent for scintillation and detection of light. The nanostructured neutron detector material 30 includes neutron target atoms 35 (e.g., (Li-6) responsible for neutron absorption, activator atoms 50 responsible for scintillation light emission (Ce, Pr or Eu) and all other atoms 60 such as Al, Si, O etc. which are included in the detector material 30, but are not directly responsible for primary energy absorption or scintillation light emission.

In the detector material of the present invention shown in FIG. 5, the energy transformation process proceeds in the following way. Primary energy absorption takes place when thermal neutrons of incident radiation hit neutron target atoms 35 and nuclear reactions occur. Reaction products 40 (alpha and triton particles in the case of Li-6 neutron target atoms with path according to FIG. 3) are emitted and travel in the detector material 30 creating "hot" electrons along their route. At the final stage, energy of "hot" electrons dissipates in the detector material at their interactions with atoms which compose detector material 30. In the case when activator atoms 50 are excited in the process of these interactions, then scintillation light photons are emitted and propagate in optically transparent detector material 30 to a photodetector, which detects and measures the light photons.

The number of scintillation light photons per unit of primarily absorbed energy of thermal neutrons is a measure of the energy transformation efficiency, commonly referred as conversion efficiency of the detector material, or light yield of the detector material. The larger conversion efficiency (light yield) of the detector material—the larger number of photons will reach the photodetector producing a larger electric pulse with improved energy resolution and improved signal-to-noise ratio.

The nanostructured neutron detector material 30 as disclosed herein has improved conversion efficiency when compared to prior art detectors. The improved conversion efficiency is due to the presence of scintillating nano-crystallites 45 with crystal periodic structure in the detector material 30. The nano-crystallites 45 are formed in the detector glass body of the detector material 30 in the process of spontaneous recrystallization of some fraction of its volume (for simplicity, boundaries of scintillating nano-crystallites 45 are shown as having spherical shape). Inside the nano-crystallites 45, atoms of the nano-crystallites 45 form a regular structure of crystal lattices, whereas atoms surrounding the nano-crystallites 45 still are distributed randomly forming a conventional amorphous (irregular) structure of glass. It is noted that that these atoms inside the nano-crystallites 45 include both neutron target atoms 35 and activator atoms 50. In an amorphous structure, only a small part of energy losses of "hot" electrons is converted into scintillation emissions due to inefficient energy transfer to activator atoms 50 and the main part of primarily absorbed energy of thermal neutrons is lost ineffectively for material heating, without scintillation. In turn, when reaction products propagate inside the crystal periodic structure of the nano-crystallites 45 producing "hot" electrons, all energy losses of "hot" electrons at their interaction with atoms composing the crystal lattice can be efficiently (from several to 100 times more efficiently than in an amorphous structure) delivered to activator atoms 50 via exciton mechanism of energy transfer. Accordingly, i) placing activator atoms 50 inside the nano-crystallites increases efficiency of the energy transfer from a "hot" electron to an activator atom due to the exciton mechanism and ii) placing target atoms 35 inside the nano-crystallites 45 increases the number of "hot" electrons created inside the nano-crystallites 45, which is especially important since the concentration of target atoms 35 in a detector material is relatively low, generally no more than 10 at. %.

It is also noted that, depending on the recrystallization process, up to about 80% of the total volume of the glass body of the detector material 30 can be transformed to the nano-crystallites 45, which have a regular periodic structure, without loss of optical transparency of the detector material 30. This also means that up to about 80% of the neutron target atoms 35 and the activator atoms 50 are located inside the nano-crystallites 45. It is noted that the scintillating nano-crystallites 45 may contact each other without loss of transparency. The nano-crystallites 45 have a diameter or size dimension of about 100 nano-meters. At such dimensions, there is still no crystal phase separation in the nano-crystallites 45 and no differences in refraction indexes of different phases even if the nano-crystallites 45 contact each other. Phase separation (and variation of refractive indices) takes place for nano-crystallites having dimensions starting from several hundred of nm to one micron. Thus, 100 nm is one example of an optimal size for the nano-crystallites 45 because they are large enough to contain excitons still ensuring crystal phase stability.

Figure 6:
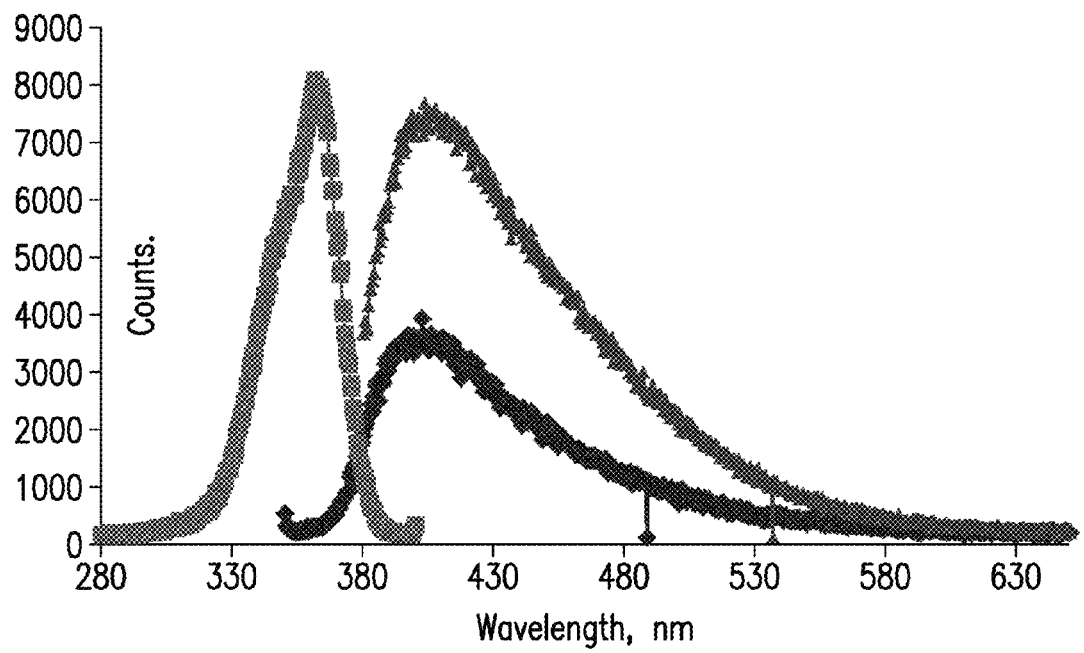
FIG. 6 depicts aspects of room temperature luminescence and luminescence excitation spectra measured in glass before temperature treatment.
Figure 7:
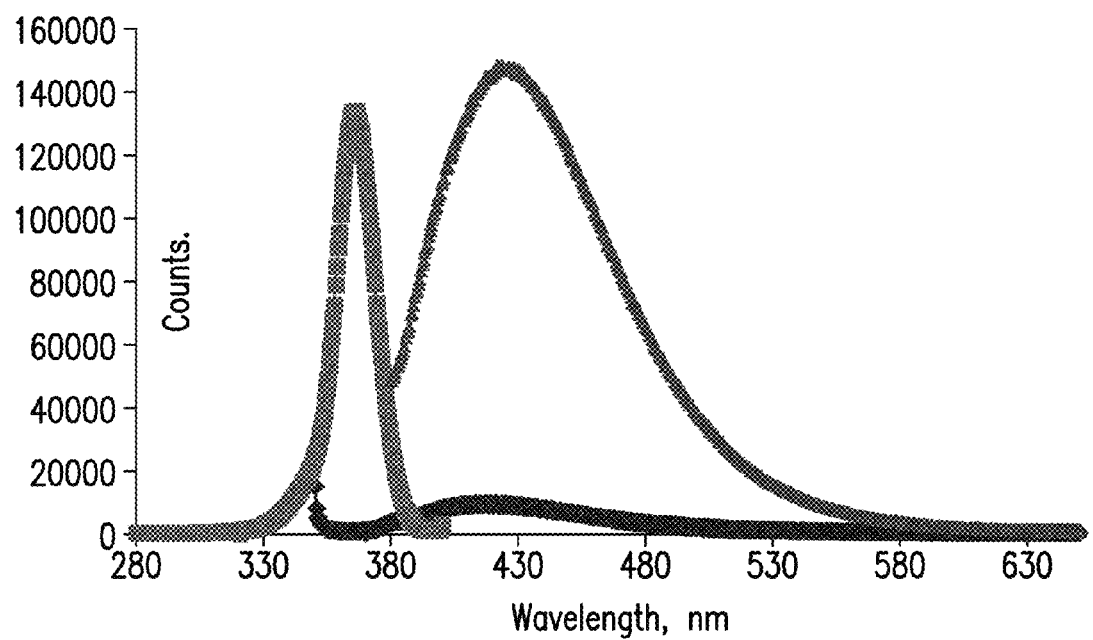
FIG. 7 depicts aspects of room temperature luminescence and luminescence excitation spectra measured in the glass after temperature treatment.

Cerium $Ce^{3+}$ ions located in orderly sites in a nano-crystalline structure have improved luminescent properties compared to these ions in an amorphous glass. The change of the luminescent properties from the amorphous glass to the nano-crystalline structure for the $Al_2O_3$—$Li_2O$—$SiO_2$ system doped with Ce is demonstrated in FIGS. 6 and 7. The luminescence of the glass before annealing (i.e., heat treating process) is illustrated in FIG. 6 and contains two bands having maxima near 390 and 410 nm. The first band is dedicated to $Ce^{3+}$ luminescent centers in amorphous glass in the $Al_2O_3$—$Li_2O$—$SiO_2$ system. The second band is due to $Ce^{3+}$ localized in a few nano-crystallites that appear in the amorphous glass due to a finite time of the melt cooling and gradient of the temperature of the glass, so crystallization starts immediately. FIG. 7 illustrates the luminescence of the same sample annealed at 520° C. during 10 hours at atmospheric conditions. Strong domination of the 410 nm band is observed indicating domination of luminescence of $Ce^{3+}$ centers in many nano-crystallites. Also, constriction of the excitation band is observed indicating reduction of inhomogeneous broadening of the excitation band which is typical for amorphous glass systems in a comparison with the nano-crystallites as disclosed herein. Predominant localization of $Ce^{3+}$ ions in nano-crystallites improves the factor S (equation 1) thereby increasing scintillation light yield. In FIGS. 6 and 7, the curves on the left with maxima near 360 nm represent luminescence excitation spectra and the curves on the right with maxima near 400-430 nm represent luminescence spectra measured with excitation wavelengths 365 nm (upper curves) and 340 nm (lower curves).

It is noted that the relaxation of "hot" carriers created in the process of the interaction of charged particles with activators (i.e., scintillation material) in the detector material is localized in an area extending approximately 100 nm from the trajectories of charges particles formed at the first stage of the neutron detection process. This localization of the relaxation process provides the opportunity to improve the performance of glass scintillators through the creation of the nano-crystallites in the glass matrix of the detector material. In this case, for those "hot" electrons formed along the charged particle trajectory, the relaxation and light emission take place in the nano-crystallites and are defined by the properties of the $Ce^{3+}$ ions localized in nano-crystallites. As a result, improved matching of the spectrum of the light emitted in the scintillation process and light adsorption spectrum of the glass itself can be reached minimizing self-absorption of emitted light on its way to the photodetector. Further, fine matching of the index of refraction of the glass matrix surrounding the nano-crystallites with the index of refraction of the nano-crystallites avoids optical transmittance deterioration of the detector material to improve light detection by the photodetector.

It can be appreciated that the use of the nano-crystallites in the detector material is very different from conventional composite neutron sensitive scintillators made of the mechanical mixture of $B_2O_3$ and ZnS:Ag particles of micron size. In the case of the mechanical mixture, the 10B enriched boron oxide works as neutron absorber and the ZnS:Ag particles convert Li+ and alpha particle (He+) species emitted in a neutron absorption reaction into visible light. The size of $B_2O_3$ and ZnS:Ag particles is chosen to be smaller than mean free path of alpha particle in these materials, which is about 5 um (micron). As a result, the $B_2O_3$—ZnS:Ag composite scintillator has very low transparency due to light scattering at the boundaries of the material grains. Therefore this conventional composite scintillator can be used only in the form of thin layer deposited at the surface of an optical window of a photomultiplier tube. The scintillation material in the nano-crystallites formed in the glass of the detector material does not suffer from this problem if the size of the nano-crystallites is at least four times smaller than the wavelength of the light emitted in the scintillation process (approximately 400 nm for $Ce^{3+}$ activated scintillators). Also, if the size of the nano-crystallites is approximately 100 nm instead of 1 μm, there will be a much more uniform distribution of scintillation material inside of the glass matrix of the neutron detection material resulting in better performance parameters of the scintillation material. Another benefit from the use of nano-crystallites for neutron interaction material and scintillation material is an isolation of the nano-crystallites from each other in the glass matrix in the detection material. This isolation prevents migration quenching of the activator luminescence, which is one of the factors limiting scintillation light yield in single crystals.

The nano-crystallites in the glass matrix of the neutron detector material can be produced by several methods. One of the methods is based on the synthesis used to obtain glass ceramic materials. After glass manufacturing, the glass is exposed to a temperature at T, which is higher than glass vitrification temperature Tg of spodumen but less than the temperature of the avalanche crystallization of spodumen, for an extended period of time. The main goal of this step is to form the nano-crystallites in the glass matrix.

Another approach to synthesize the glass with the desired nano-crystallite structure is to use a mixture of the nano-crystals of petalite, which prevent an immediate crystallization of spodumen crystallites at the glass cooling after heat treatment, and glass matrix material as a raw material for the glass synthesis. In order for the glass matrix material to be sensitive to neutron detection/absorption and have a high neutron detection efficiency, the glass matrix material contains a relatively high concentration of $^6Li$ in one or more embodiments. The glass itself is synthesized by heating the raw materials according to the temperature program illustrated in FIG. 8.

Figure 8:
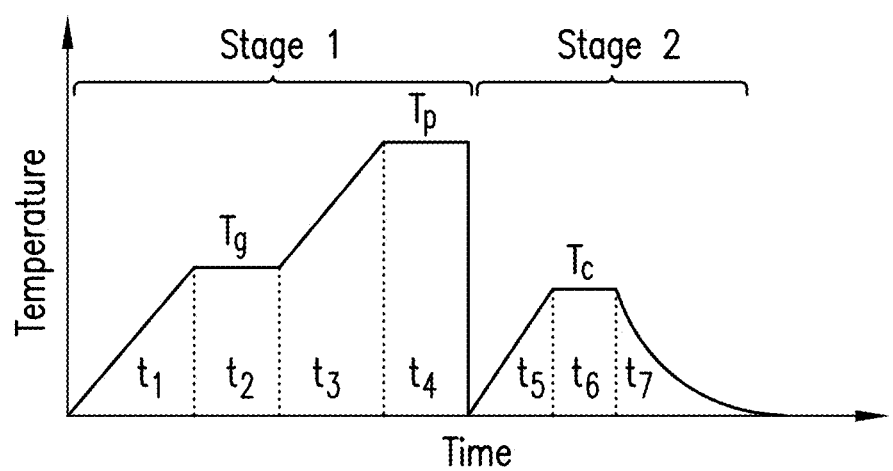
FIG. 8 depicts aspects of a temperature program used to synthesize glass ceramics.

Referring to FIG. 8, Stage 1 of the synthesis process relates to melting the glass matrix material to form a homogeneous glass structure. This stage includes several steps. During time period t1 (starting at room temperature in one or more embodiments), the mixture is heated up to the temperature of vitrification, Tg, where different parts of the mixture start to smelt to each other and is kept at this temperature during time period t2 to outgas the material. The duration of t2 is different for different glasses and can vary from 0 to hundreds of hours. During time period t3, the temperature of the material is increased up to the glass melting temperature Tp. The obtained glass melt is kept at this temperature during time period t4 for its homogenization and, after this it is cooled very rapidly at a cooling rate greater than 500° C./min to a temperature at or above room temperature.

The main goal of Stage 2 of the synthesis process is to create the nano-crystallites in the glass matrix by annealing (i.e., heat treating) the glass obtained in Stage 1 at temperature Tp, which is higher than glass vitrification temperature Tg but less than temperature of the avalanche crystallization of spodumen. The temperature of the glass is slowly increased during time period t5. Then, the glass is annealed at constant temperature Tc during time period t6. Alternatively, the temperature Tc can be slowly increased during the recrystallization depending on the composition of ingredients in the $Al_2O_3$—$Li_2O$—$SiO_2$ glass system. The slow increase in the temperature Tc can play a positive role at balancing surface and volume recrystallization depending on the composition of ingredients in the $Al_2O_3$—$Li_2O$—$SiO_2$ glass system.

In a first example, a composition of chemicals in weight % $Al_2O_3(17)$, $SiO_2(60)$, $Li_2O(14)$, MgO(3), $CeO_2(6)$ is mixed and heated during time t1=10-60 min in the atmosphere to temperature Tg=480-520° C. and kept for t2=1-20 min. The mixture is then heated during t3=10-60 min to Tp (1380-1450° C.) and kept there for t4=60-120 min and then quenched in the mold with the temperature decreasing at a rate of 300-600° C./min. The resulting glass is then heated during t5=10-60 min. to temperature Tc=520-550° C. and kept at this temperature during t6=600-120 min. Then, it is cooled within the oven to room temperature during $t_7$, which can be in the range of 0.5-24 hours.

In a second example, a composition of the chemicals in weight %, $Al_2O_3(15.3)$, $SiO_2(73.4)$ and $Li_2CO_3(11.3)$ is mixed and heated at 950° C. for 120-1200 min. to create petalite phase. A composition of sintered material containing petalite in weight % (67), MgO(3), Al2O3(6), Li2CO3(24) is mixed. To the obtained mixture, cerium oxide (6% by weight) is admixed to obtain raw material. The raw material is heated during time t1=10-60 min in a reduced atmosphere to temperature Tg=480-520° C. and kept at Tg for t2=1-20 min. The resulting material is then heated during t3=10-60 min to Tp (1380-1450° C.) and kept at Tp for t4=60-120 min. and then quenched in the mold with the temperature decrease rate of 300-600° C./min. The obtained glass is heated during t5=10-60 min. to temperature Tc=520-550° C. during t6=600-120 min. Then, it is cooled within the oven to room temperature during $t_7$, which can be in the range of 0.5-24 hours.

One approach to increase the probability of the successful creation of nano-crystallites during Stage 2 of the synthesis process is to increase duration of the time interval t6. But, too long heat treatment can cause a crystallization of micro crystallites (diameter or size greater than or equal to 1000 nm) of spodumen when almost all matter of the mixture is converted into the aggregation of crystallites with sizes exceeding 100 nm. As a result, instead of transparent glass, non-transparent glass ceramics is produced. Another approach is to use the mechanical mixture of the synthesized compounds of petalite and spodumen as raw materials to prepare glass. However, the avalanche recrystallization of spodumen occurs when molten glass is cooled down with the same consequences. Hence, the necessary cool-down rate to avoid recrystallization is 300-600° C./min as discussed above.

It can be appreciated that one skilled in the art will know that the nano-crystallites are very small objects that are measured in nanometers. Nano-crystallites can range in diameter (when nano-crystallite is approximated by a sphere) or dimension (when nano-crystallite is approximated by other than a sphere) from one nanometer to a hundred or more nanometers, but are generally less than one micron for purposes of this disclosure. It can also be appreciated that while the neutron absorber material disclosed above is in the embodiment of a glass matrix containing the nano-crystallites, other embodiments of material transparent to light other than glass can also be used to contain the nano-crystallites.

Figure 9:
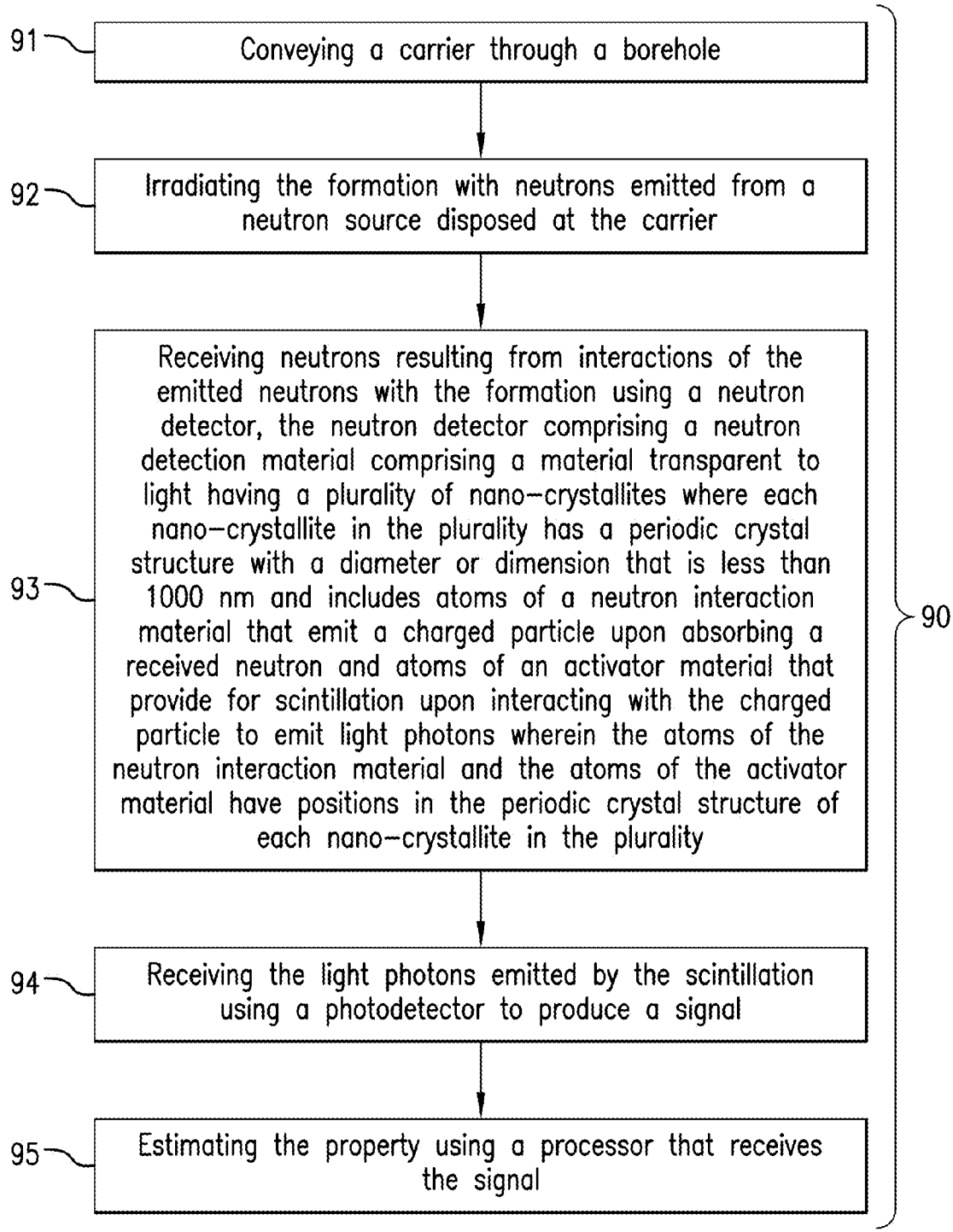
FIG. 9 is a flow chart of a method for estimating a property of an earth formation.

FIG. 9 is a flow diagram for a method 90 for estimating a property of an earth formation penetrated by a borehole. Block 91 calls for conveying a carrier through the borehole. Block 92 calls for irradiating the formation with neutrons emitted from a neutron source disposed at the carrier. Block 93 calls for receiving neutrons resulting from interactions of emitted neutrons with the formation using a neutron detector. The neutron detector includes a neutron detection material that is made of a transparent material containing a plurality of nano-crystallites having a periodic crystal structure with a diameter or dimension that is less than 1000 nm. Each nano-crystallite in the plurality includes atoms of a neutron interaction material that emit an energetic electron upon interacting with a received neutron and atoms of an activator material that provide for scintillation upon interacting with the electron to emit light photons. The atoms of the neutron interaction material and the atoms of the activator material have positions in the periodic crystal structure of each nano-crystallite in the plurality. Block 94 calls for receiving the light photons with a photodetector to produce a signal. Block 95 calls estimating the property using the signal.

Figure 10:
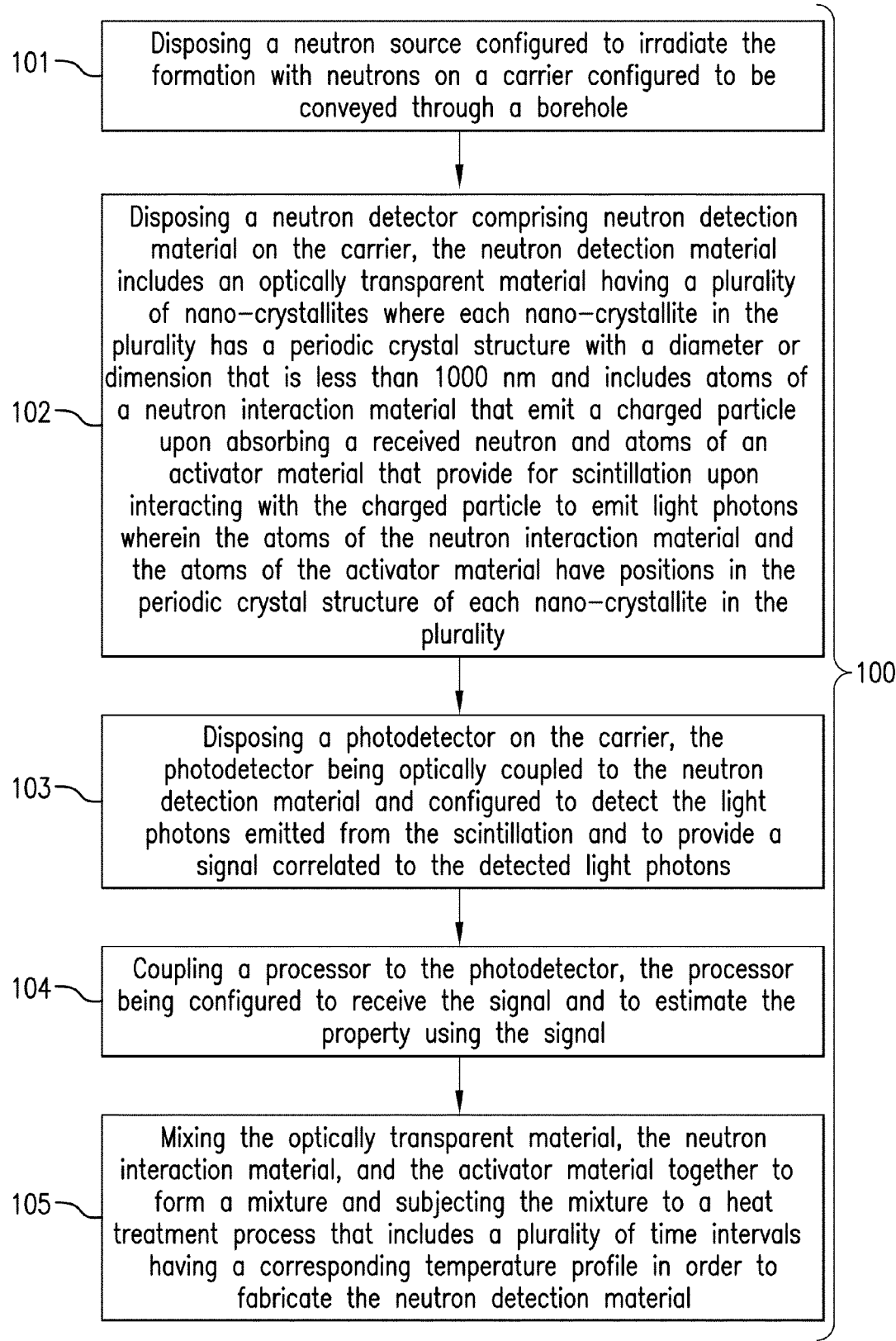
FIG. 10 is a flow chart of a method for fabricating an apparatus for estimating a property of an earth formation penetrated by a borehole.

FIG. 10 is a flow diagram for a method 100 for fabricating an apparatus for estimating a property of an earth formation penetrated by a borehole. Block 101 calls for disposing a neutron source configured to irradiate the formation with neutrons on a carrier configured to be conveyed through the borehole. Block 102 calls for disposing a neutron detector having neutron detection material on the carrier. The neutron detection material includes an optically transparent material having a plurality of nano-crystallites where each nano-crystallite in the plurality has a periodic crystal structure with a diameter or dimension that is less than 1000 nm. Each nano-crystallite in the plurality includes atoms of a neutron interaction material that emit an energetic electron upon absorbing a received neutron and atoms of an activator material that provide for scintillation upon interacting with the electron to emit light photons wherein the atoms of the neutron interaction material and the atoms of the activator material have positions in the periodic crystal structure of each nano-crystallite in the plurality. Block 103 calls for disposing a photodetector on the carrier, the photodetector being optically coupled to the neutron detection material and configured to detect the light photons emitted from the scintillation and to provide a signal correlated to the detected light photons. Block 104 calls for coupling a processor to the photodetector, the processor being configured to receive the signal and to estimate the property using the signal. Block 105 calls for mixing the optically transparent material, the neutron interaction material, and the activator material together to form a mixture and subjecting the mixture to a heat treatment process that includes a plurality of time intervals having a corresponding temperature profile in order to fabricate the neutron detection material.

In support of the teachings herein, various analysis components may be used, including a digital and/or an analog system. For example, the downhole electronics 11 or the surface computer processing 12 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
   a carrier configured to be conveyed through the borehole;
   a neutron source disposed on the carrier and configured to irradiate the formation with neutrons;
   a neutron detector disposed at the carrier and comprising a neutron detection material, the neutron detection material comprising a material transparent to light having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality;
   a photodetector optically coupled to the neutron detection material and configured to detect the light photons emitted from the scintillation and to provide a signal correlated to the detected light photons; and
   a processor configured to estimate the property using the signal.

2. The apparatus according to claim 1, wherein each nano-crystallite in the plurality has a diameter or dimension in a range of 50 to 150 nm.

3. The apparatus according to claim 1, wherein the neutron detection material comprises a glass system containing the plurality of nano-crystallites.

4. The apparatus according to claim 3, wherein the glass system comprises $Al_2O_3$-$Li_2O$-$SiO_2$.

5. The apparatus according to claim 1, wherein the neutron interaction material in each nano-crystallite comprises Lithium.

6. The apparatus according to claim 1, wherein the activator material comprises Cerium.

7. The apparatus according to claim 1, where two or more of the nano-crystallites in the plurality are in contact with each other.

8. The apparatus according to claim 1, wherein the carrier comprises a wireline, a drill string or coiled tubing.

9. A method for estimating a property of an earth formation penetrated by a borehole, the method comprising:
   conveying a carrier through the borehole;
   irradiating the formation with neutrons emitted from a neutron source;
   receiving neutrons resulting from interactions of the emitted neutrons with the formation using a neutron detector, the neutron detector comprising a neutron detection material comprising a material transparent to light having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality;
   receiving the light photons emitted by the scintillation using a photodetector to produce a signal; and
   estimating the property using a processor that receives the signal.

10. The method according to claim 9, wherein a diameter or dimension of each of the nano-crystallites in the plurality is at least four times smaller than a wavelength of light emitted by the scintillation.

11. The method according to claim 9, wherein each crystallite in the plurality has a diameter or dimension in a range of 50 to 150 nm.

12. A method for fabricating an apparatus for estimating a property of an earth formation penetrated by a borehole, the method comprising:
   disposing a neutron source configured to irradiate the formation with neutrons on a carrier configured to be conveyed through the borehole;
   disposing a neutron detector comprising neutron detection material on the carrier, the neutron detection material comprising an optically transparent material having a plurality of nano-crystallites where each nano-crystallite in the plurality has a periodic crystal structure with a diameter or dimension that is less than 1000 nm and includes atoms of a neutron interaction material that emit a charged particle upon absorbing a received neutron and atoms of an activator material that provide for scintillation upon interacting with the charged particle to emit light photons wherein the atoms of the neutron interaction material and the atoms of the activator material have positions in the periodic crystal structure of each nano-crystallite in the plurality;

disposing a photodetector on the carrier, the photodetector being optically coupled to the neutron detection material and configured to detect the light photons emitted from the scintillation and to provide a signal correlated to the detected light photons; and coupling a processor to the photodetector, the processor being configured to receive the signal and to estimate the property using the signal;

wherein the neutron detector material having the plurality of nano-crystallites is fabricated by a method comprising:

mixing the optically transparent material, the neutron interaction material, and the activator material together to form a mixture; and subjecting the mixture to a heat treatment process that includes a plurality of time intervals having a corresponding temperature profile.

13. The method according to claim 12, wherein each time interval has a temperature profile that is different from the other temperature profiles.

14. The method according to claim 12, further comprising mixing petalite nano-particles in the mixture before subjecting the mixture to the heat treatment process.

15. The method according to claim 12, wherein the plurality of time intervals comprises at least seven time intervals.

* * * * *